United States Patent
Johnson (10) Patent No.: US 7,596,901 B1
(45) Date of Patent: Oct. 6, 2009

(54) FISHING RIG DROGUE APPARATUS

(76) Inventor: Joe Johnson, 612 Wolfe St., Brunswick, GA (US) 31520-8443

( * ) Notice: Subject to any disclaimer, the term of this patent is extended or adjusted under 35 U.S.C. 154(b) by 0 days.

(21) Appl. No.: 12/053,212

(22) Filed: Mar. 21, 2008

Related U.S. Application Data (63) Continuation-in-part of application No. 11/162,458, filed on Sep. 10, 2005.

(51) Int. Cl.
| | |
|---|---|
| A01K 91/06 | (2006.01) |
| A01K 91/10 | (2006.01) |
| B63B 21/44 | (2006.01) |
| B63B 21/46 | (2006.01) |

(52) U.S. Cl. .................. 43/43.1; 43/42.22; 43/42.23; 43/15; 114/298; 114/299; 114/311

(58) Field of Classification Search .......... 43/4, 43/5, 42.03, 42.22, 42.23, 44.87, 43.1, 44.97, 43/15; 114/311, 244, 253, 294, 297, 299, 114/298

See application file for complete search history.

(56) References Cited

U.S. PATENT DOCUMENTS

| | | | | | |
|---|---|---|---|---|---|
| 60,287 | A | * | 12/1866 | Upton | 114/311 |
| 167,784 | A | * | 9/1875 | Pierce | 43/42.02 |
| 285,075 | A | * | 9/1883 | Rix | 43/44.97 |
| 289,224 | A | * | 11/1883 | Clarke | 114/311 |
| 363,579 | A | * | 5/1887 | Best | 43/44.96 |
| 396,229 | A | * | 1/1889 | Pagan | 114/311 |
| 652,162 | A | * | 6/1900 | Blackburn | 114/299 |
| 843,946 | A | * | 2/1907 | Howald | 43/43.1 |
| 923,854 | A | * | 6/1909 | Kenyon | 43/42.02 |
| 1,334,702 | A | * | 3/1920 | Juras | 43/37 |
| 1,453,177 | A | * | 4/1923 | Peterson | 43/44.96 |
| 1,543,562 | A | * | 6/1925 | Fleming | 114/311 |
| 1,606,176 | A | * | 11/1926 | Paulson | 43/42.22 |
| 1,782,449 | A | * | 11/1930 | Siebert | 43/44.96 |
| 1,857,312 | A | * | 5/1932 | Kuehn | 43/42.02 |
| 1,874,102 | A | * | 8/1932 | Jacobs | 43/42.13 |
| 2,109,693 | A | * | 3/1938 | Gaines et al. | 43/44.97 |
| 2,153,339 | A | * | 4/1939 | Reeves et al. | 43/44.91 |
| 2,491,564 | A | * | 12/1949 | Iversen | 114/311 |
| 2,537,235 | A | * | 1/1951 | Parry | 43/44.9 |
| 2,537,321 | A | * | 1/1951 | Walton | 43/43.1 |
| 2,598,140 | A | * | 5/1952 | Shukites | 43/43.1 |
| 2,651,136 | A | * | 9/1953 | Kruze | 43/44.96 |
| 2,768,467 | A | * | 10/1956 | Radune | 43/15 |
| 2,883,786 | A | * | 4/1959 | Smith | 43/42.22 |
| 2,883,787 | A | * | 4/1959 | Dahl | 43/42.22 |
| 2,945,324 | A | * | 7/1960 | Miller | 43/44.97 |
| 2,956,529 | A | * | 10/1960 | Samalion | 114/299 |

(Continued)

FOREIGN PATENT DOCUMENTS

DE 3718019 C1 * 9/1988

*Primary Examiner*—Darren W Ark
(74) *Attorney, Agent, or Firm*—Jonathan Rigdon Smith, PC; Jonathan R. Smith (57) ABSTRACT

A drogue attachment consisting of two symmetrical shaped arms is affixed to one end of a shaft, that end of the shaft being attached to a fishing line. The other end of the shaft is tied to a leader, which is in turn tied to a baited or lure-equipped fish hook device. When the fish hook device is pulled through the water by a fish, water opens the shaped arms; when pulled in the other direction by the angler, the arms fold in against the shaft.

15 Claims, 12 Drawing Sheets

U.S. PATENT DOCUMENTS

| | | | | |
|---|---|---|---|---|
| 3,029,767 A * | 4/1962 | Donnan | 114/311 |
| 3,039,419 A * | 6/1962 | Rimar | 43/6 |
| 3,057,318 A * | 10/1962 | Churchward | 114/299 |
| 3,059,607 A * | 10/1962 | Wheeler | 114/299 |
| 3,071,095 A * | 1/1963 | Davis | 114/299 |
| 3,087,275 A * | 4/1963 | Svoboda | 43/44.87 |
| 3,111,107 A * | 11/1963 | Henry et al. | 114/299 |
| 3,123,037 A * | 3/1964 | Jensen | 114/298 |
| 3,182,625 A * | 5/1965 | White | 114/299 |
| 3,187,705 A * | 6/1965 | Costello et al. | 114/294 |
| 3,263,642 A * | 8/1966 | Wilson | 114/297 |
| 3,269,348 A * | 8/1966 | Churchward | 114/299 |
| 3,296,996 A * | 1/1967 | Miller | 114/253 |
| 3,396,484 A * | 8/1968 | Clark | 43/44.97 |
| 3,404,652 A * | 10/1968 | Gardy | 114/297 |
| 3,466,787 A * | 9/1969 | Collins | 43/42.22 |
| 3,518,957 A * | 7/1970 | George | 114/297 |
| 3,557,739 A * | 1/1971 | Kaercher | 114/299 |
| 3,688,434 A * | 9/1972 | Le Vau | 43/44.97 |
| 3,708,904 A * | 1/1973 | Zaharis | 43/42.23 |
| 3,715,828 A * | 2/1973 | Johnson et al. | 43/6 |
| 3,766,878 A * | 10/1973 | Hogue | 114/299 |
| 3,943,483 A * | 3/1976 | Strange | 114/245 |
| 4,037,348 A * | 7/1977 | Kruger | 43/42.23 |
| 4,057,024 A * | 11/1977 | Adams | 114/298 |
| 4,096,818 A * | 6/1978 | Wameling | 114/311 |
| 4,210,092 A * | 7/1980 | Battersby | 114/299 |
| 4,337,717 A * | 7/1982 | Gregory | 114/297 |
| 4,543,904 A * | 10/1985 | Puoti | 114/294 |
| 4,638,591 A * | 1/1987 | Neumann et al. | 43/34 |
| 4,653,219 A * | 3/1987 | Kaupert | 43/43.1 |
| 4,718,188 A * | 1/1988 | Roberts | 43/4 |
| 4,721,054 A * | 1/1988 | Kobayashi | 114/299 |
| 4,763,597 A * | 8/1988 | Stupakis | 114/297 |
| 4,958,583 A * | 9/1990 | Renouard | 114/253 |
| 4,958,586 A * | 9/1990 | Stupakis | 114/297 |
| 5,025,746 A * | 6/1991 | Boulter | 114/311 |
| 5,108,326 A * | 4/1992 | Seiler | 114/311 |
| 5,353,731 A * | 10/1994 | Richter | 114/299 |
| 5,622,135 A * | 4/1997 | Eberline, Sr. | 114/299 |
| 6,035,798 A * | 3/2000 | Johnson | 114/299 |
| 7,065,918 B2 * | 6/2006 | Leone | 43/43.1 |
| 7,162,829 B2 * | 1/2007 | Braaten | 43/42.23 |
| 7,337,576 B2 * | 3/2008 | Boltan et al. | 43/5 |
| 7,370,450 B2 * | 5/2008 | Roos | 43/36 |
| 2002/0095854 A1* | 7/2002 | Kinnear | 43/42.03 |
| 2005/0198889 A1* | 9/2005 | Lubinsky et al. | 43/42.02 |
| 2006/0137239 A1* | 6/2006 | Link | 43/44.87 |
| 2008/0022581 A1* | 1/2008 | Link | 43/44.97 |
| 2008/0141922 A1* | 6/2008 | Muehlner | 114/294 |

* cited by examiner

FISHING RIG DROGUE APPARATUS

PRIORITY CLAIM

This application is a Continuation-In-Part of nonprovisional application Ser. No. 11/162,458 filed Sep. 10, 2005.

FIELD OF INVENTION

This invention relates to the field of angling, more specifically to surface fishing and trolling, and still more specifically to controlling tension on a hooked fish.

BACKGROUND OF INVENTION

Fishing for big game fish (such as marlin, king mackerel, and dolphin) involves not only attracting and hooking the fish, but also keeping the fish on the hook and finally reeling it in against its efforts to free itself. The process of reeling in the fish further involves "playing" the fish so as to exhaust the fish's energy while not allowing it to break the line. This means the angler must reel the fish in skillfully, allowing it to fight to some extent and also periodically let the fish run the line out with little resistance. In this way, the fish's endurance is depleted to the point it can be reeled into the boat with little chance of loss.

Battling game fish is enjoyable, but it can be laborious, and on rare occasions injurious, to the angler. Moreover, it often causes considerable wear or even damage to the reel assembly, even if it does not culminate in the loss of the fish. Sometimes the entire tackle is snapped or pulled overboard. A need exists for a device that assists the angler in setting the hook and keeping limited tension on the hook at all times, without taking the fun out of the fishing. The present invention solves this problem by helping to prevent the fish from breaking the line when it is fighting most violently, firmly setting the hook, all the while increasing the satisfaction of the sport by increasing the chance of landing the fish.

BRIEF DESCRIPTION OF THE INVENTION

In addition to the first four embodiments disclosed in the parent application to which this application is a continuation-in-part, this application discloses two additional embodiments utilizing the same principle. Both of the additional embodiments include, instead of an umbrella-like drogue, a pair of elongate arms attached to the rigid, substantially straight shaft, the first end of the being connected to a fishing line coming from a rod and reel, and the second end of the shaft being attached through a swivel to a leader tied to a fish hook device (such as a baited fishhook, lure-equipped fishhook or multiple hooks). The elongate arms are essentially semi-cylindrical in shape so that they may fit compactly alongside either side the shaft. The arms are hinged at one end, the hinged ends being near the first end of the shaft, so that when the shaft is pulled toward the fish hook device underwater, water enters the concave side of the semi-cylindrical arms, opening them away from the shaft. When the shaft is pulled in the other direction by the fishing line, the arms rotate inwardly toward the shaft.

The two additional embodiments of this invention are differentiated by the manner in which the fishing line attaches to the first end of the shaft. The fifth embodiment has the fishing line attached to the second end simply by interposing a swivel between the fishing line and the second end. This embodiment, called the "surface dweller," tends to stay near the surface of the water while in use. The sixth embodiment has the fishing line attached to a ring, which slides on a slide wire attached to one side of the shaft. This embodiment, called the "depth dweller," operates at a depth selected by the user and may be suspended in the water either horizontally or vertically.

It is an object of this invention to reduce the chance of breakage of a fishing line due to yanking on the line by a hooked fish. It is a further object of the invention to provide resistance to essentially every movement of a fish to exhaust its energy. Another object of the invention is to provide resistance to fish movement so as to more firmly set the hook in the fish's mouth. Yet another object of the invention is to relieve the above-described increased resistance when the direction of motion reverses toward the angler when the line is being reeled in. A further object of the invention is to provide optional increased control of the pitch attitude of the apparatus in the water (an aspect of the sixth embodiment.) Another object of the invention is to provide the aforementioned resistance and relief of resistance to motion in a manner alternative to cords and panels, thus reducing the potential for tangling and fouling as the apparatus is pulled in either direction through the water, and for inversion under strong pull by a fish.

DETAILED DESCRIPTION OF THE INVENTION

The following is a detailed description of the invention in which like reference characters in the text of this specification refer to like elements in all of the drawings.

Figure 1:
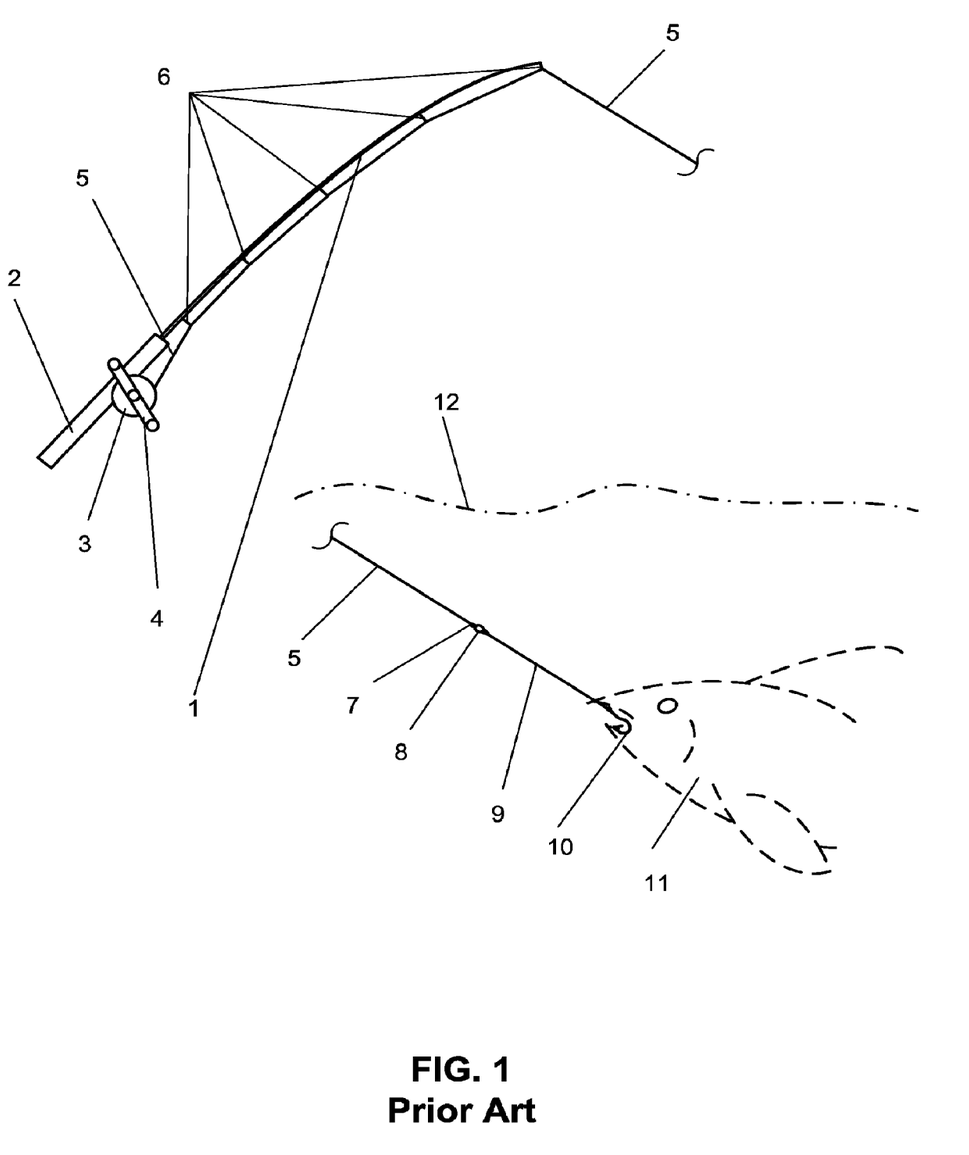
FIG. 1 depicts a typical prior art arrangement of fishing tackle.

FIG. 1 depicts a simple typical prior art arrangement of fishing tackle used in surface fishing. It comprises a flexible fishing rod 1 equipped with a rigid handle 2. Attached to the handle 2 is a reel 3 with a crank 4. The crank 4 permits an angler to wind and unwind a fishing line 5 onto and off of a spool (not shown) within the reel 3. The line 5 typically runs through a plurality of line guides 6 to keep the line 5 close to the rod 1 as it bends. At the free end 7 of the fishing line 5 is tied a swivel 8, to which in turn is tied a length of heavy-gauge leader 9, and at the other end of the leader is typically tied a fish hook device 10. The presence of a large game fish 11 is shown below water surface 12 keeping line 5 taut at all points between the fish 11 and the reel 3. A sudden motion of the fish 11 resisting pull on handle 2 by the angler (not shown) to pull the fish 11 toward the angler may break the line 5, freeing the fish 11 and losing the fish hook device 10.

Figure 2:
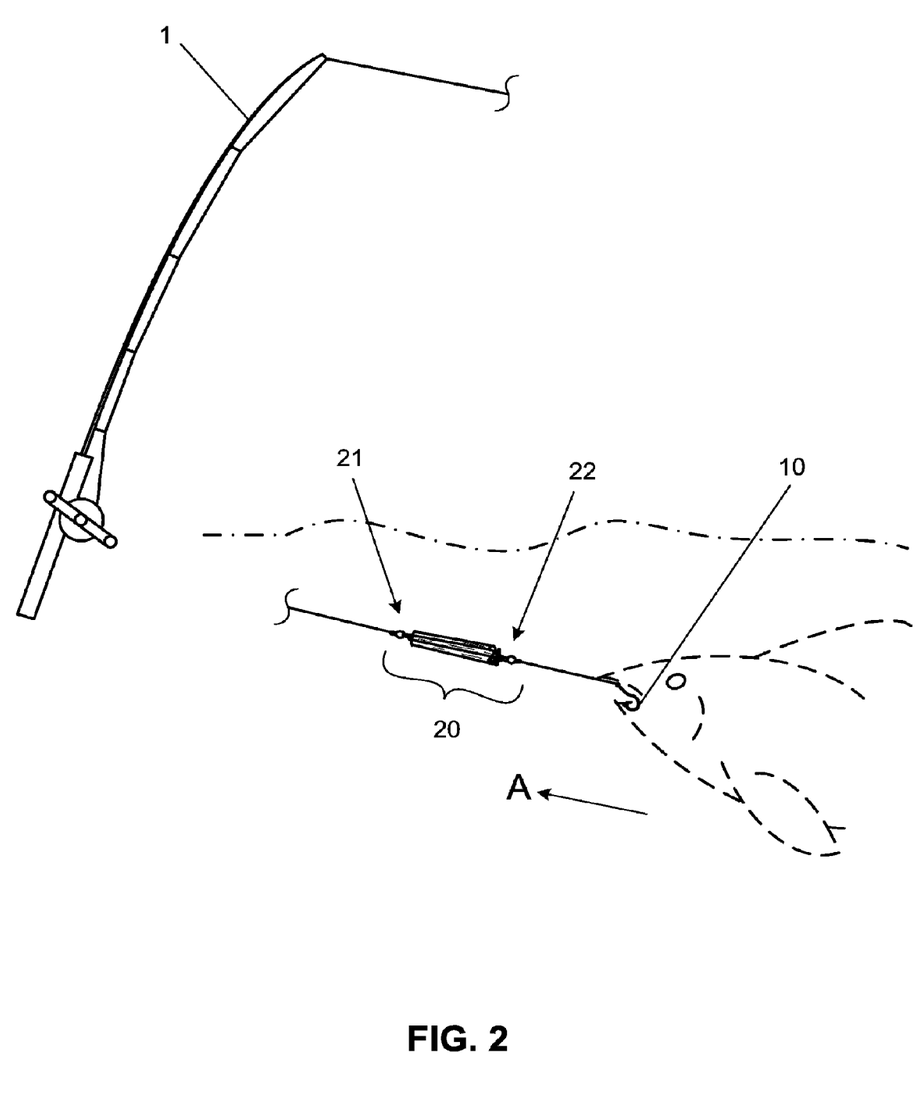
FIG. 2 is a perspective view of the first embodiment of the invention in its closed position.

FIG. 2 is a perspective view of the first embodiment of the invention before a fish has taken the bait. The first embodiment consists of a drogue assembly 20 having the fishing line 5 attached to a first attachment means 21, and a heavier-gauge leader attached to a second attachment means 22. Details of the drogue assembly 20 will be disclosed further on in this specification. When the fish hook device 10 has no load on it, line 5 may be reeled in toward rod 1 as shown in this view in the direction of arrow A. Such motion causes the water to collapse drogue assembly 20, which will create insignificant drag through the water and therefore a negligible increase in the effort necessary to reel in line 5.

Figure 3:
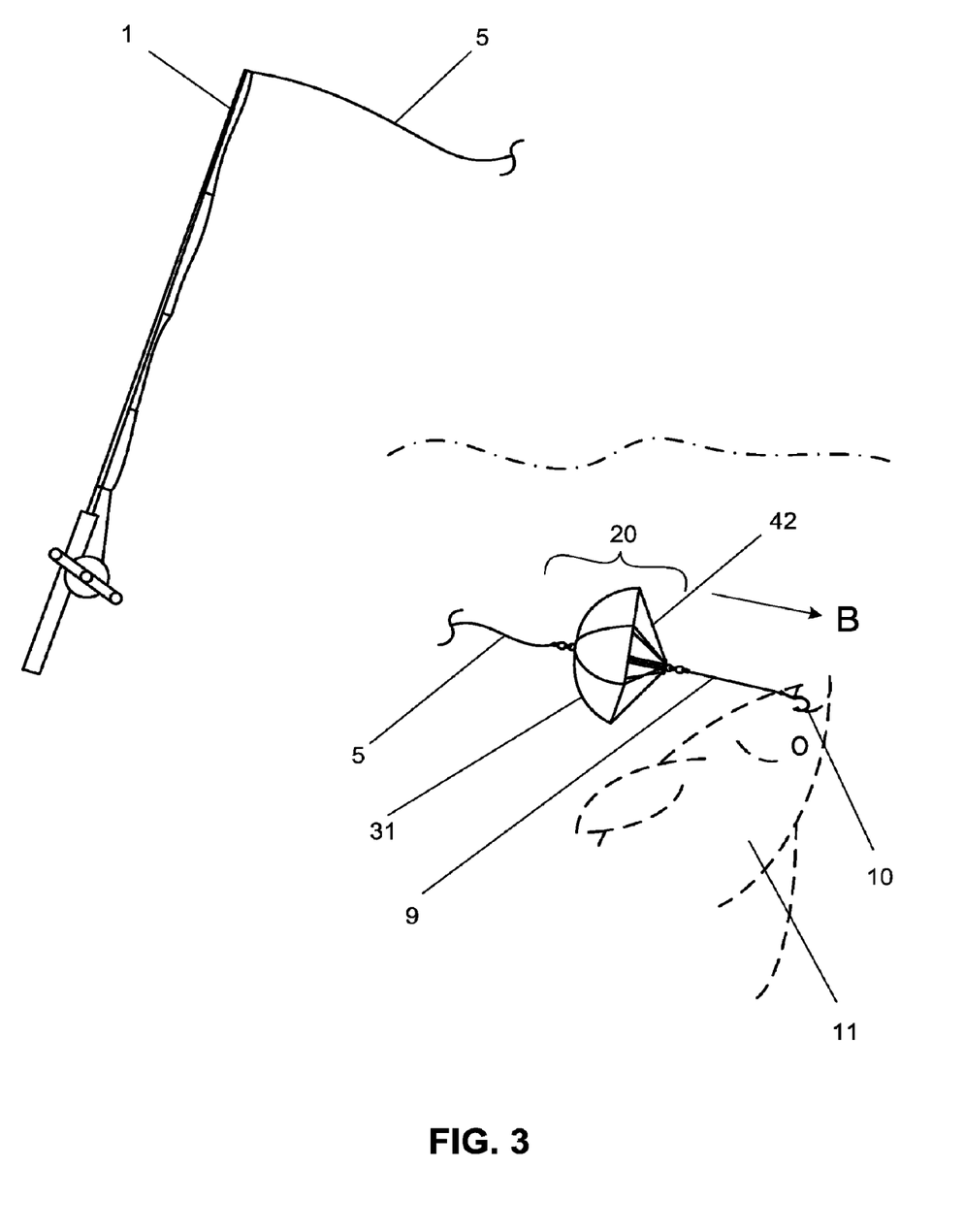
FIG. 3 is a perspective view of the first embodiment of the invention in its open position.

FIG. 3 is a perspective view of the first embodiment of the invention after a fish 11 has taken the fish hook device 10, dragging the drogue assembly 20 in potentially any direction, depicted by arrow B. This motion, even if it is toward the boat, will cause the drogue 31 to open substantially perpendicularly to leader 9 and fill with water, absorbing all force in the direction B and relieving tension on line 5. When the fish changes direction as it fights, the drogue 31 will tend to remain open perpendicularly to leader 9. Thus, no matter which direction fish 11 pulls, the drogue 31 will remain optimally oriented to react oppositely to the fish, maintaining high tension on leader 9, perhaps more deeply setting fish hook device 10 in fish 11, and continuing to maintain low tension on line 5 unless it is applied intentionally from the rod by the angler. The drogue assembly 20 is principally characterized by an umbrella-like drogue 31 made from panels formed into a conical or pyramidal shape or by flexible sheet material, which, when filled with water, is constrained into a bowl-like shape. This illustration shows the constraint being provided by a plurality of cords 42, but this depiction is not meant to exclude constraint being provided by the shape, dimensions, and manner of joining the panels (see FIG. 8, described further below) rather than by cords 42.

Figure 4:
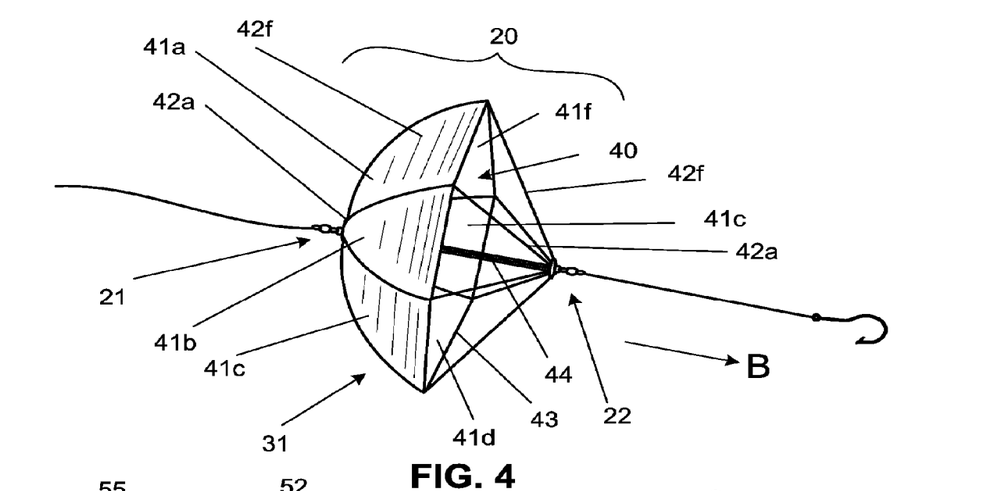
FIG. 4 is a perspective close-up view of the first embodiment of the invention in its open position.

FIG. 4 is a perspective close-up view of the first embodiment of the invention with the drogue assembly 20 and the drogue 31 itself in its open position. In this view, all parts to the right of first attachment means 21 are being pulled to the right in direction B. Water enters and fills space 40 defined by a plurality of panels 41a-f, which deploy outwardly in an umbrella-like fashion. The panel 41a is connected to panels 41b and 41f along cords 42a and 42f, respectively, to add to the overall tensile strength of the apparatus. Other cords connect the other panels in a similar fashion. Cords 42a, 42f, etc., further extend a suitable distance beyond the rearward edges of panels 41 to second attachment means 22. This limits the outward extent of the opening of the panels 41a-f so as to prevent tangling and assure that the drogue will collapse and re-inflate repeatedly as necessary.

This illustration shows six panels 41a-f but is not meant to limit the number of panels 41.

Alternatively, panels 41a-f may be joined together at two edges or be cut from one piece of flexible material, so that cords 42a-f may simply be attached to the periphery 43 of the drogue 31 rather than extending all the way from the second attachment means 22 to the first attachment means 21.

Note also that in the first embodiment, straight shaft 44 is shown in this figure attached to second attachment means 22, extending into drogue 31 along its centerline. It is attached at its other end (not shown) to first attachment means 21. Thus, first attachment means 21 and second attachment means 22 are held apart a fixed distance by straight shaft 44. The purpose of straight shaft 44 is to support the drogue 31 and cords 42, and to deter tangling.

A desirable aspect of this invention is that the panels or sheet material 41 may be colored or patterned in a way attractive to fish, thereby increasing the chance the bait or lure will be attacked.

Figure 5A:
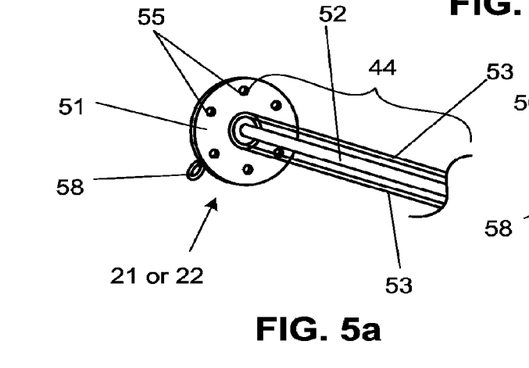
FIGS. 5a and 5b show detail views from two different angles of attachment means for parts of the first embodiment.
Figure 5B:
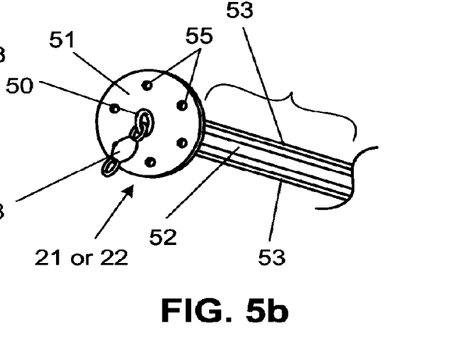

FIGS. 5a and 5b show detail views from two different angles of attachment means for parts of the first embodiment. First attachment means 21 (a mirror image of second attachment means 22) is shown fixed to the straight shaft 44. The first attachment means as seen in FIG. 5a shows the center of disc 51 to one end of a metal rod 52. Metal rod 52 is lined with a rigid tube 53 to form straight shaft 44. The combination of rod 52 and tube 53 adds strength and rigidity to the entire apparatus, and the tube 53 provides additional support for disc 51. It is important to note, however, that straight shaft 44 may be made entirely of any rigid material, such as molded thermoplastic, and that the first and second attachment means 21 and 22 respectively may be molded integrally into the ends of the straight shaft 44. FIG. 5b shows the opposite side of disc 51, to which center is attached ring 50 at right angles to disc 51. A swivel 54 is attached to ring 50. The disc 51 as part of the first attachment means 21 can hold the center of the panels or sheet material comprising the drogue 31 by providing holes 55 around the edge of disc 51 and tying the upper ends of cords 42 (see FIG. 4) through the holes 55. The disc 51, as part of the second attachment means 22, can hold the lower ends of cords 42 by tying them through the holes 55.

Other means of securing the center of the drogue 31 to the first attachment means include placing a reinforced hole in the center of the material (not shown) and sandwiching it between the ring 50 and the disc 51 in FIG. 5a, or by gluing the material to the side of disc 51 visible in FIG. 5a. Finally, swivel 58 is attached to ring 50 in both first and second attachment means (21 and 22 respectively). Swivels are typically used between elements of fishing tackle to prevent them from winding up and tangling, but they are not essential to the function of any of the embodiments specified here.

Figure 6:
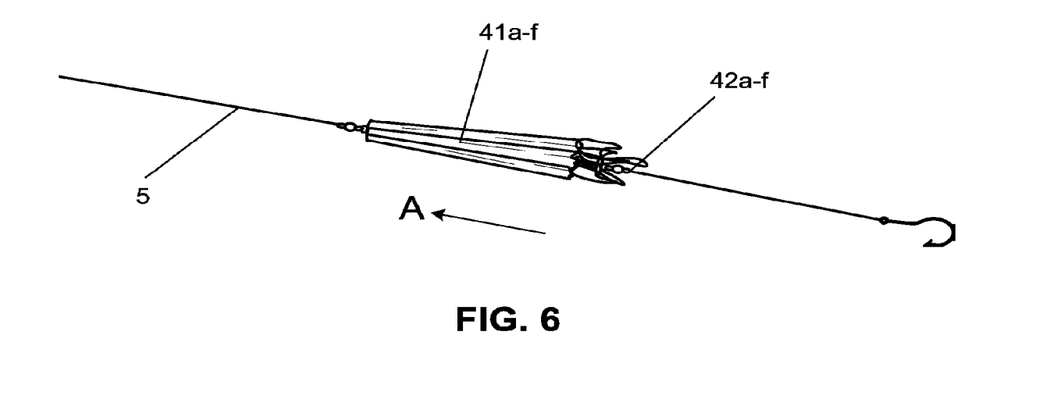
FIG. 6 is a perspective close-up view of the first embodiment of the invention in its closed position.

FIG. 6 is a perspective close-up view of the first embodiment of the invention in its closed position. Here, the angler is reeling in line 5 in direction A. Material 41 is collapsed against straight shaft 44 (not visible) and cords 42 are slack. Because of its reduced profile in the direction of motion, the apparatus adds little to the tension required to reel in the fish (not shown).

Figure 7:
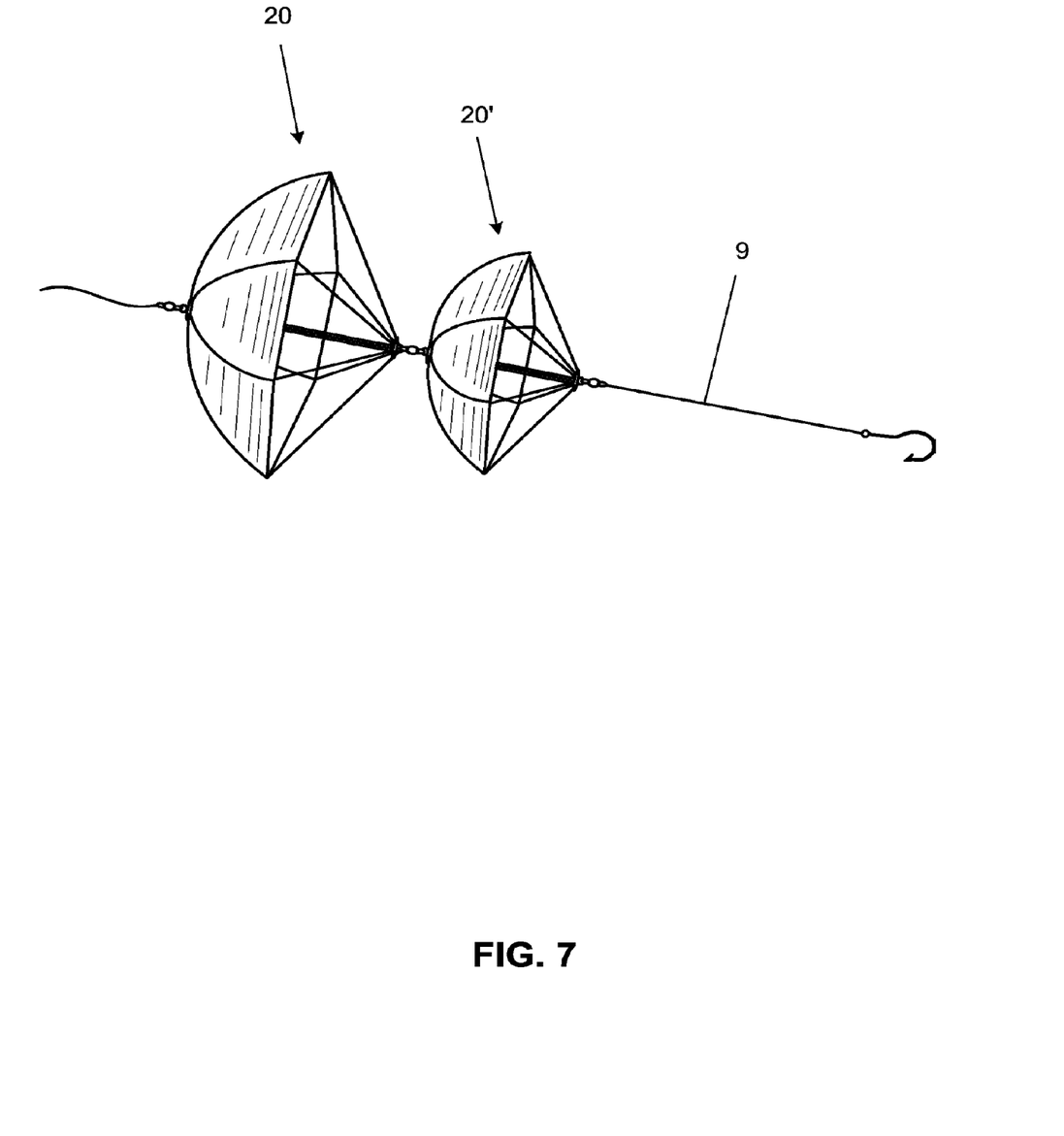
FIG. 7 is a perspective view of a second embodiment of the invention.

FIG. 7 is a perspective view of a second embodiment of the invention, which utilizes more than one drogue assembly 20 in series. In this embodiment, a first drogue assembly 20 is accompanied by a second drogue assembly 20'. Here, the larger drogue assembly 20 will tend to open first because of its greater collapsed width. providing a first level of tension on the leader 9, and drogue assembly 20' will open if speed through the water increases. Thus, two levels of drag are achieved.

Having a plurality of drogues may be advantageous regardless of relative size as insurance in case a large game fish damages one of them in pursuit of the lure or bait.

Figure 8:
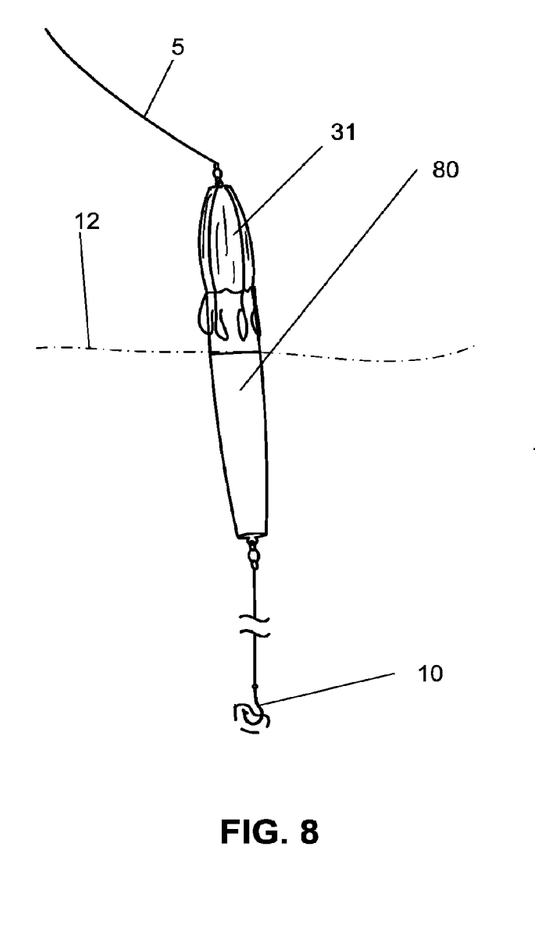
FIG. 8 is a perspective view of a third embodiment of the invention in its closed position.

FIG. 8 is a perspective view of a third embodiment of the invention. This embodiment is intended for surface drift fishing. Such fish include, e.g., speckled trout and sea bass. This embodiment comprises a drogue 31 attached at its top end to the top of an elongated (as depicted, "cigar" type) float 80. In FIG. 8, the float 80 is bobbing at water surface 12 with a fish hook device 10 depending below it.

Figure 9:
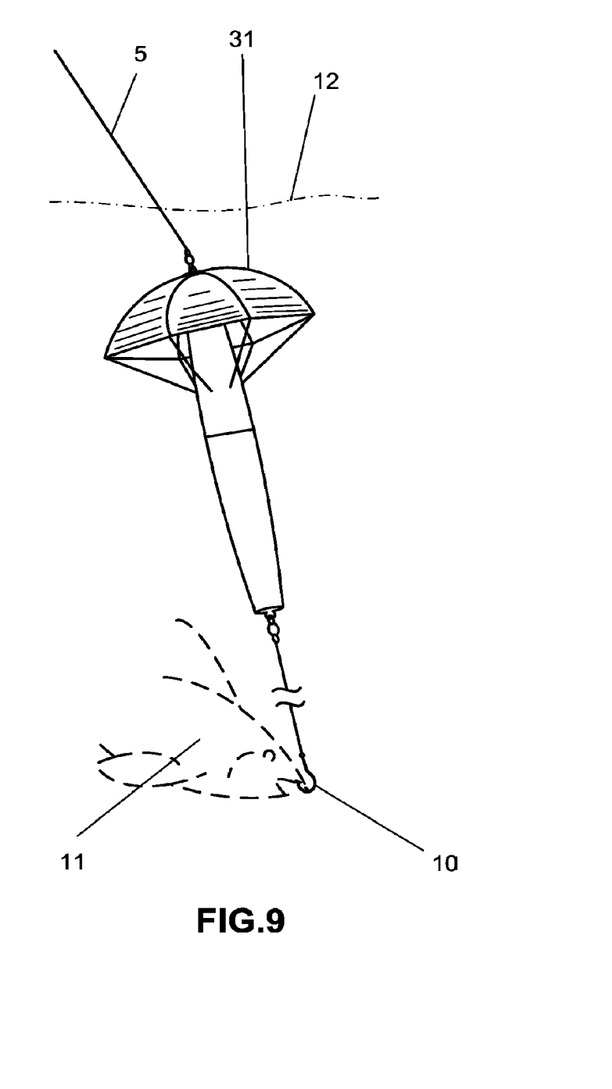
FIG. 9 is a perspective view of the third embodiment of the invention in its open position.

FIG. 9 is a perspective view of the third embodiment of the invention after the bait has been taken by a surface fish 11. As soon as the fish 11 sinks the float, the drogue 31 opens, setting the fish hook device 10 in the fish's mouth immediately. In other words, the setting of the fish hook device occurs even if the angler is not immediately aware the float has moved.

Figure 10:
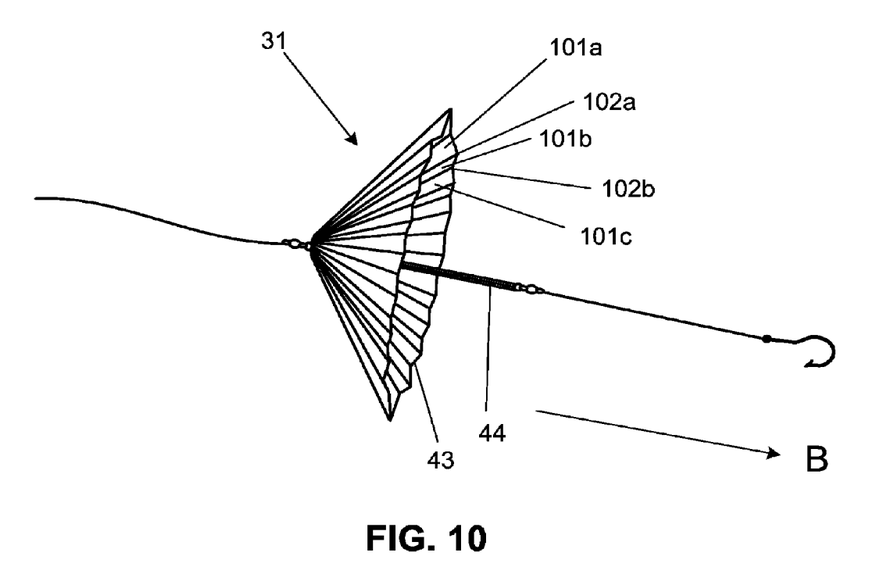
FIG. 10 is a perspective view of a fourth embodiment of the invention in its open position.
Figure 11:
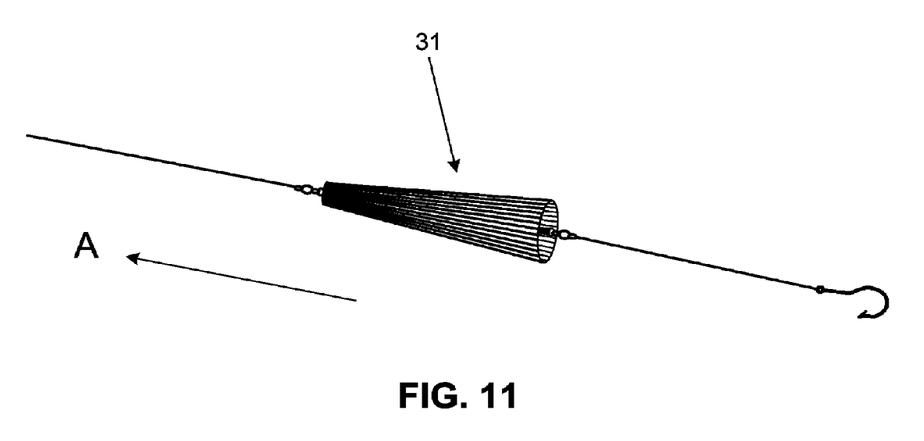
FIG. 11 is a perspective view of a fourth embodiment of the invention in its closed position.

FIG. 10 is a perspective view of a fourth embodiment of the invention in which a cordless drogue 31 (shown here in its open position caused by moving through water in direction B) is used in place of the drogues depicted in any of the first three embodiments. For simplicity in illustrating the differences between this and the first three embodiments, the drogue in the fourth embodiment is best compared to the drogue 31 depicted in FIG. 4. In FIG. 10, this drogue, hereinafter called an accordion-pleated drogue, is comprised of a plurality of substantially isosceles triangular rigid strips 101*a*, 101*b*, etc., each with the isosceles sides being elongate and connected along flexible joints 102*a*, 102*b*, etc. The flexible joints are hinged such that adjacent joints, e.g., 102*a* and 102*b*, fold oppositely. In this illustration, for example, joint 102*a* folds inwardly, so that joint 102*a* is farther from straight shaft 44 than are strips 101*a* and 101*b*, while joint 102*b* folds outwardly, so that joint 102*b* is nearer to straight shaft 44 than strips 101*b* and 101*c*. This assures that when the apparatus is closed as shown in FIG. 11 (by moving through the water in direction A) it will close to a repeatable low-drag aspect. This hinging sequence exists in the prior art for the purpose of making accordion-like folding panels and is accomplished through the use of hinges that open no more than 180 degrees. A similar effect can be created by molding an accordion-pleated drogue out of a single conical or pyramidal piece of plastic and molding the joints in such a way that the plastic is thinned at the joints, and alternating joints have the thinning alternating on the inner surface and outer surface of the drogue.

A concern about this drogue is that under sufficient pull, it may invert as does an umbrella in a strong wind. This may be prevented by using sufficiently stiff sheet material for the panels 101*a*, etc., and by assuring that the periphery 43 of the fully-open drogue is significantly shorter than the circumference of a circle having a radius equal to the length of any of the joints 102.

FIG. 11 is a perspective view of the fourth embodiment in its closed position.

Figure 12:
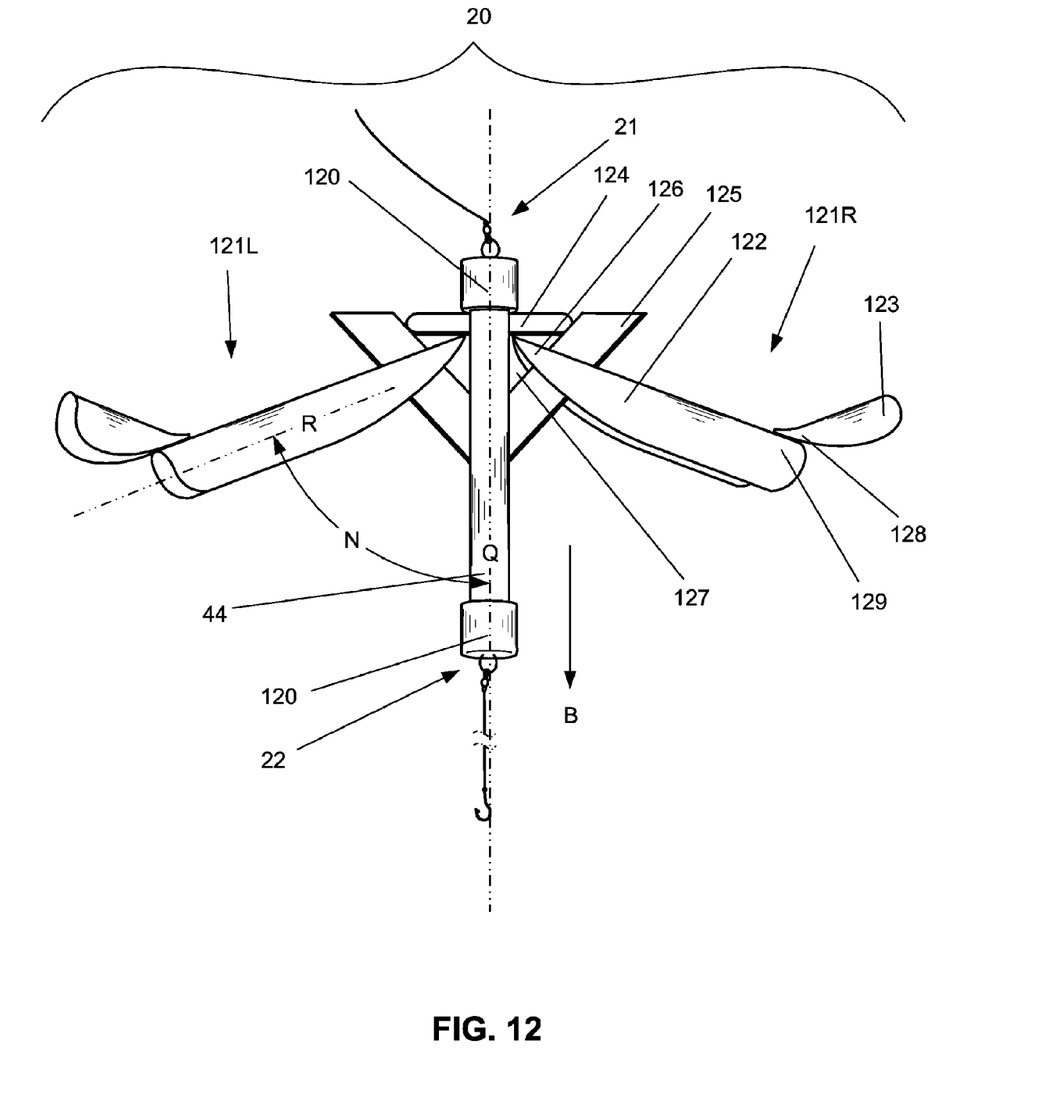
FIG. 12 is a side perspective view of a fifth embodiment of the invention in its open position.

FIG. 12 is a side perspective view of the fifth embodiment of the invention. the "surface dweller," in its open position. The straight shaft 44 is again shown with first and second attachment means 21 and 22 respectively for fishing line or leader. Here, straight shaft 44 is shown as a hollow tube with end caps 120 affixed thereto. The end caps form a watertight seal of the tube, enabling it to be weighted in any manner from buoyant (capable of floating on the water surface) to readily submersible. In this embodiment, drogue assembly 20 has, instead of an umbrella-like structure, preferably two arms 121L and 121R arrayed on either side of straight shaft 44. The arms 121L and 121R each have a shaped semi-cylindrical portion 122 and a flared portion 123, and the entire structure is more or less bilaterally symmetrical about the centerline Q of straight shaft 44. The semi-cylindrical shape more particularly consists of a substantially cylindrical tubular shape cut substantially in half along its longitudinal axis, creating a longitudinal trough on one side. Each shaped semi-cylindrical portion 122 has a first axis R and a slot (not visible in this view, see FIG. 13) near its upper end 126. It is permanently but movably attached to straight shaft 44 by a latch 124 and a vane 125 cooperating with the slot. A hinge is effectively formed by upper end 126 being loosely held within the closed space 127 formed by the intersection of latch 124 and vane 125. In this view, the invention is moving through the water downwardly (direction B), which causes arms 121 to lift and open outwardly from straight shaft 44.

By proper selection of the shapes of latch 124, vane 125, and upper end 126, and the length of the slot, the maximum angle N which first axis R of each semi-cylindrical portion 22 can attain relative to centerline Q of straight shaft 44 is about 90 degrees.

The proximal edge 128 of flared portion 123 is fixedly attached to the distal end 129 of semi-cylindrical portion 122 as shown. The shape of semi-cylindrical portion 122 and the curved shape of flared portion 123 combine to enhance the drag produced by the surrounding water on the entire apparatus.

Figure 13:
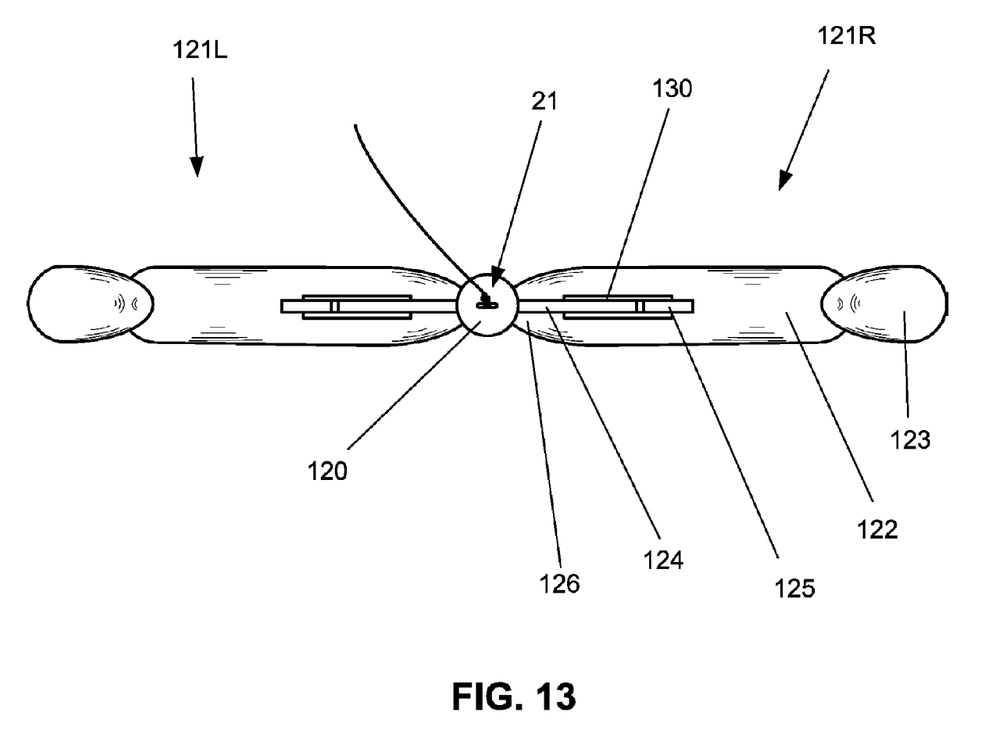
FIG. 13 is a top view of the fifth embodiment of the invention in its open position.

FIG. 13 is a top view of the fifth embodiment of the invention in its open position. Here, slot 130 is visible, through which passes vane 125. Slot 130 is large enough to allow semi-cylindrical portion 122 to move freely upward and downward in a direction parallel with the axis of the shaft (below cap 120) with minimal twisting about the axis of semi-cylindrical portion 122 and minimal movement of body 122 in the plane of this drawing against vane 125.

While vane 125 and latch 124 are shown here as separate elements, they may, within the scope of this invention, be joined together at their intersection to form a single flat vane.

Figure 14:
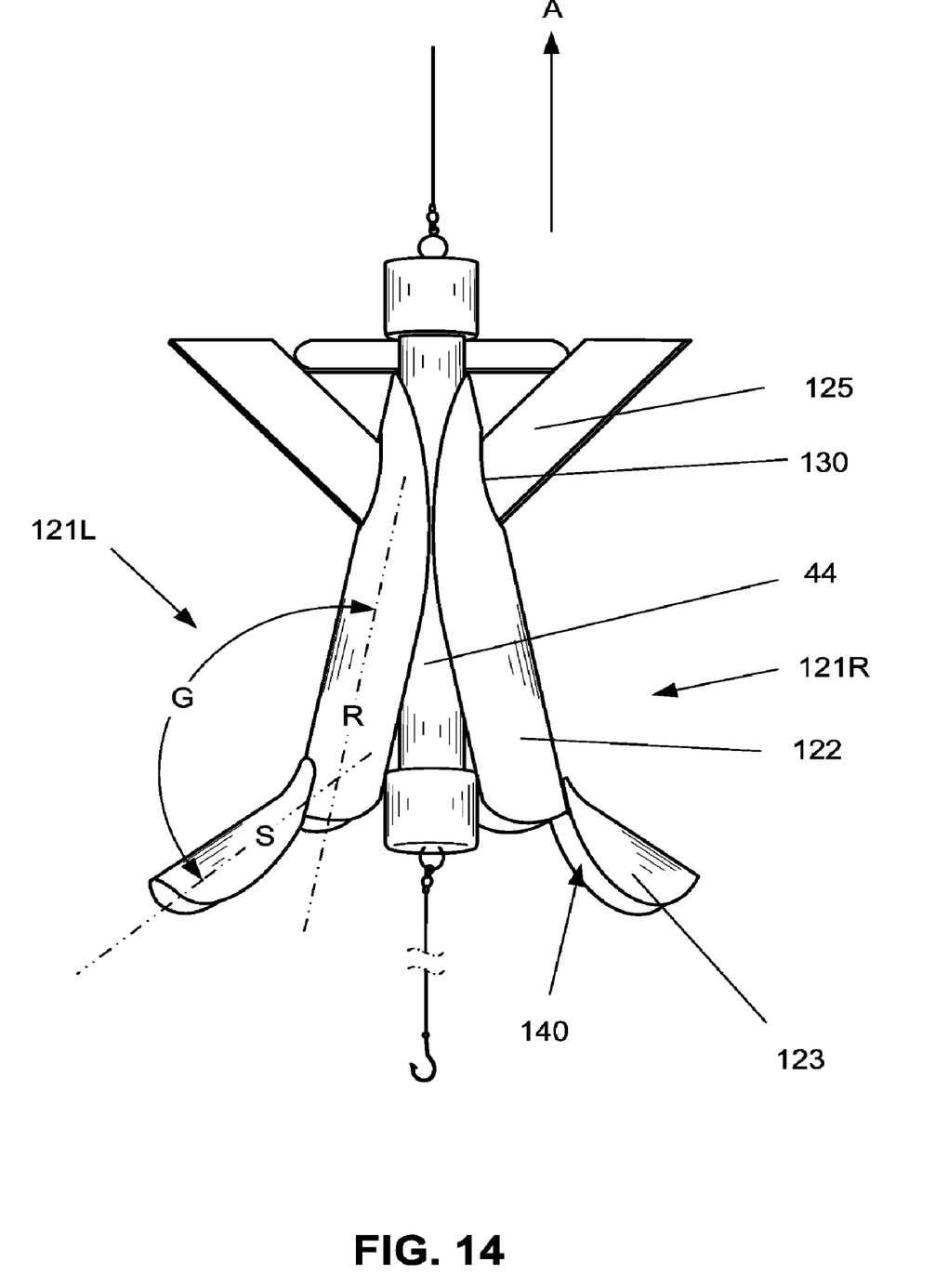
FIG. 14 is a side perspective view of a fifth embodiment of the invention in its closed position.

FIG. 14 is a side perspective view of the fifth embodiment of the invention in its closed position. Here, the apparatus is moving through the water in direction A. This causes arms 121L and 121R to fold back against straight shaft 44. Note that slot 130 has slid back along vane 125, but closed space 127 holds upper end 126 of semi-cylindrical portion 122, preventing semi-cylindrical portion 122 from detaching from the apparatus.

FIG. 14 also highlights the utility of flared portions 123. A flared portion 123 has a concavity in the same general downward direction as the corresponding semi-cylindrical portion 122, but the axis (second axis S) of the concavity of a flared portion is not collinear with the axis (first axis R) of the semi-cylindrical portion to which the flared portion is attached. Second axis S of the concavity of flared portion 123 is at an angle G from the axis of semi-cylindrical portion 122 such that when semi-cylindrical portion 122 is most closely aligned with straight shaft 44, a roughly conical space 140 is formed which allows water to push flared portion 123 and semi-cylindrical portion 122 away from straight shaft 44 when the motion of the apparatus through the water is reversed. Angle G is preferably between 100 degrees and 180 degrees.

Figure 15:
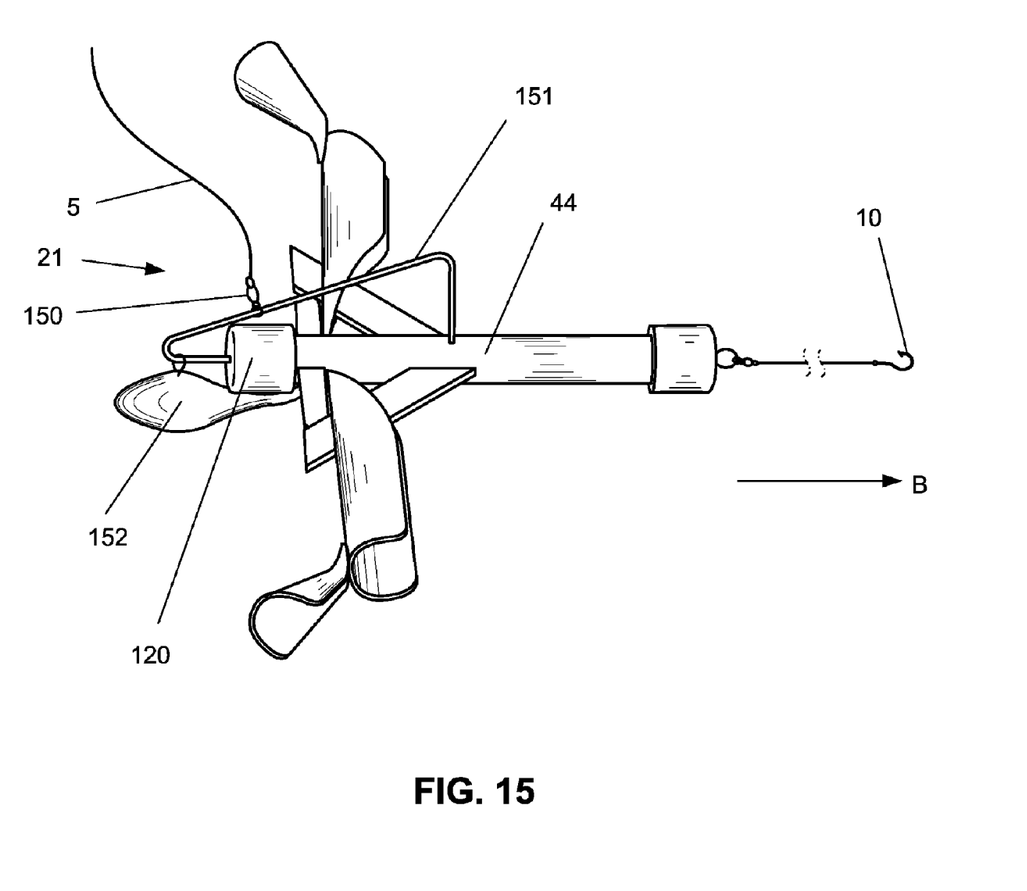
FIG. 15 is a side perspective view of a sixth embodiment of the invention in its open position.

FIG. 15 is a side perspective view of the sixth embodiment of the invention, the "depth dweller," in its open position. This embodiment differs from the fifth embodiment in that first attachment means 21, rather than consisting of a swivel between fishing line 5 and upper end cap 120, consists here of a swivel 150 sliding along shaped wire 151. Shaped wire extends from upper end cap 120 forwardly for a short distance, then rearwardly alongside straight shaft 44, and finally reattaches to straight shaft 44 on the side of straight shaft 44 midway between arms 121R and 121L. A weight 152 may be affixed to wire 151 and straight shaft 44 on the side of straight shaft 44 opposite to wire 151. Here, as with the fifth embodiment in FIG. 12, motion through the water in direction B causes arms 121R and 121L to open outwardly from straight shaft 44 and resist pull on hook device 10 by a fish.

Figure 16:
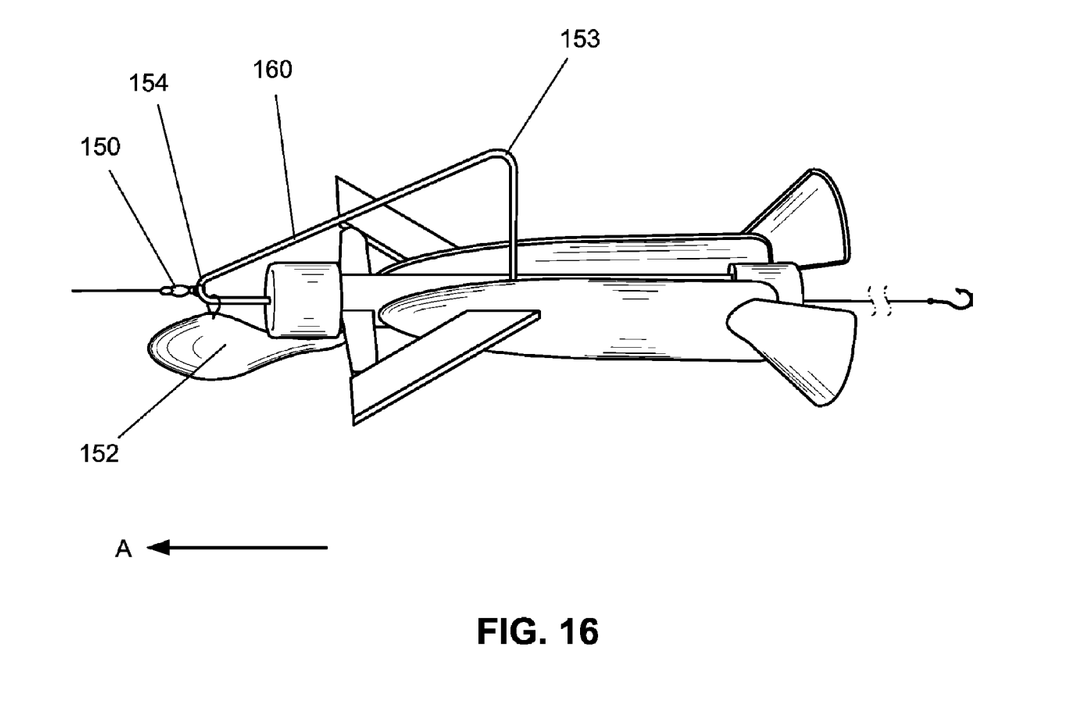
FIG. 16 is a side perspective view of a sixth embodiment of the invention in its closed position.

FIG. 16 is a side perspective view of the sixth embodiment of the invention in its closed position, caused by the apparatus being pulled by the angler through the water in direction A. In use and under tension from a fishing rod while trolling, for example, the sixth embodiment will assume a nose-down attitude and dive when swivel 150 is moved rearwardly toward rearward bend 153 by a skilled angler. Alternatively, it will assume a nose-up attitude and ascend in the water when swivel 150 is moved forwardly toward forward bend 154. The tendency to dive and recover from diving may be varied by varying the amount of weight 152. It can also be seen in this view that in a situation where the apparatus is not being pulled through the water, i.e., it is being lowered vertically into the water, it can be oriented vertically by initially placing swivel 150 at forward bend 154 or horizontally by initially placing swivel 150 at rearward bend 153.

The preferred shape of shaped wire 151 is a right triangle. The preferred range of angular dimensions for forward bend 154 is from 15 to 30 degrees, and the preferred range of angular dimensions for rearward bend 153 is from 60 to 75 degrees. The preferred range of the length of hypotenuse 160 is from 8 to 12 centimeters. The preferred range of the weight 152 is between 25 and 50 grams.

I claim:

1. A fishing rig drogue apparatus, comprising:
   a rigid and substantially straight shaft having a forward end, a rearward end, and a centerline, the forward end further comprising a first means for connection, and the rearward end further comprising a second means for connection;
   a plurality of shaped elongate arms each having a first end, an intermediate point, and a second end, the shaped elongate arms movably attached by hinging means to the straight shaft near the forward end;
   the hinging means allowing the shaped elongate arms to fold substantially against the straight shaft in a fully-closed position and allowing the shaped elongate arms to open to a maximum extent of approximately a right angle to the straight shaft, and wherein:
   at least one of the shaped elongate arms further comprises a substantially semi-cylindrical shape between the first end and the intermediate point;
   the semi-cylindrical shape consisting of a substantially cylindrical tubular shape having a substantially longitudinal axis along which substantially half of the cylindrical tubular shape is cut away, creating a longitudinal trough on one side of the semi-cylindrical shape, the longitudinal trough on the one side of the semi-cylindrical shape facing the straight shaft when the at least one of the shaped elongate arms is folded against the straight shaft;
   said at least one of said shaped elongate arms further comprises a flared portion between said intermediate point and said second end, the flared portion having a concave side with a conical space defined about an axis, the concave side of the flared portion facing the rearward end of the straight shaft, and the flared portion having a proximal end secured to said at least one of said shaped elongate arms between said intermediate point and said second end and a distal end which is spaced from said second end; and
   the axis of said conical space, said axis of the semi-cylindrical shape, and said centerline of said straight shaft lying in a first plane.

2. The apparatus of claim 1, in which:
   said semi-cylindrical shape has a slot cut through a wall of said semi-cylindrical shape near said first end, the slot being aligned parallel to said axis of said semi-cylindrical shape; and
   said hinging means comprises:
   a vane projecting from said straight shaft near a midpoint of said straight shaft that fits slidably through said slot in the wall of said semi-cylindrical shape; and
   a latch projecting from said straight shaft near said forward end of said straight shaft that contacts the vane and prevents said semi-cylindrical shape from sliding off the vane.

3. The apparatus of claim 1, in which:
   the angle formed by said axis of said conical space and said axis of said semi-cylindrical shape being between approximately one hundred degrees and approximately one hundred eighty degrees.

4. The apparatus of claim 3, in which:
   said plurality of shaped elongate arms is two, and said two shaped elongate arms are on opposite sides of said straight shaft, the axes of the semi-cylindrical shapes of the shaped elongate arms and the centerline of the straight shaft lying in the first plane.

5. The apparatus of claim 4, in which:
   said first means for connection comprises
   a shaped wire beginning at, and affixed to, said forward end, extending forwardly along said centerline and curving outwardly away from said centerline in a second plane perpendicular to said first plane, curving backwardly toward said rearward end of said straight shaft, and ending at, and affixed to, a side of the straight shaft, and
   a swivel having one loop that slides on the shaped wire.

6. The apparatus of claim 5, in which:
   the weight and buoyancy of the apparatus is controlled by either:
   a) said straight shaft being hollow and watertight;
   b) a weight being applied on a side of said front end opposite to said shaped wire; or
   c) said straight shaft being hollow and watertight and a weight being applied on the side of said front end opposite to said shaped wire.

7. A fishing rig drogue apparatus, comprising:
   an airtight hollow straight shaft having a forward end and a rearward end, a left side, a right side, an upper side, a lower side, and a centerline;
   the forward end further comprising a first connecting means for a fishing line;
   the rearward end further comprising a second connecting means for a fish hook device;
   a left arm and a right arm movably attached at first axes to the straight shaft by a hinge means near the forward end on the left side and the right side, respectively;
   the left arm and the right arm each further comprised of a tube cut in half lengthwise so that it has an open side, a wall side, and a second axis;
   the tube mounted on the hinge means so that the open side of the tube can fold against the straight shaft;
   the hinge means comprising:
   a rectangular slot in the wall side of each of the left tube and right tube collinear with the second axis of each tube;

a left vane and a right vane fixed to the left side and the right side of the straight shaft, respectively;

the left vane and the right vane being respectively inserted through the rectangular slot in the wall side of each of the left tube and the right tube; and a left latch and a right latch fixed to the left side and the right side of the straight shaft, respectively, and engaging the left vane and the right vane so as to prevent the left tube and the right tube from sliding off the left vane and the right vane, respectively;

the left latch and the right latch being shaped so as to allow the second axes of the left arm tube and the right arm tube, respectively, to rotate from an angle of zero degrees relative to the centerline to an angle of no more than approximately ninety degrees relative to the centerline.

8. The apparatus of claim 7, in which:

said left arm and said right arm are each further comprised of a left flared portion and a right flared portion, respectively;

said wall side of said left arm tube and said wall side of said right arm tube each further comprise a proximal end near said straight shaft, and a distal end;

the left flared portion and the right flared portion each comprising a rigid wafer of material formed about a third axis and having a proximal edge, a distal edge, and a concave opening;

the proximal edge of each of the left flared portion and the right flared portion being affixed to each of the distal ends of said wall sides of said left tube and said right tube, respectively, so that each concave opening of the left flared portion and the right flared portion, respectively, are oriented toward a same general direction as said open sides of said left arm tube and said right arm tube, respectively; and the third axes of the left flared portion and the right flared portion being fixed at an angle relative to said second axes of between approximately one hundred degrees and approximately one hundred eighty degrees.

9. The apparatus of claim 8, in which:

said first connecting means comprises a shaped wire beginning at, and affixed to, said forward end of said straight shaft, extending forwardly along said centerline and curving outwardly away from said centerline in a first plane perpendicular to a second plane defined by said centerline and said second axes of said left arm tube and said right arm tube, the shaped wire curving backwardly toward said rearward end of said straight shaft, and ending at, and affixed to, said upper side of said straight shaft;

a swivel having one loop that slides on the shaped wire; and a weight affixed to said lower side near said forward end of said straight shaft.

10. The apparatus of claim 9, in which:

said shaped wire takes an approximate shape of a right triangle;

the right triangle having an adjacent side collinear with said centerline, extending to a first point forward of said forward end;

an opposite side extending perpendicularly above said upper side to a second point above said upper side; and a hypotenuse extending from the first point to the second point.

11. The apparatus of claim 10, in which:

an adjacent angle of said right triangle has the preferred range of dimensions of about 15 to about 30 degrees;

an opposite angle of said right triangle has the preferred range of dimensions of about 60 to about 75 degrees;

a length of said hypotenuse has the preferred range of length of about 8 to about 12 centimeters;

a center of mass of said weight is positioned approximately directly below said first point; and a mass of said weight has the preferred range of about 25 and about 50 grams.

12. A fishing rig drogue apparatus, comprising:

a rigid and substantially straight shaft having a forward end, a rearward end, and a centerline, the forward end further comprising a first means for connection, and the rearward end further comprising a second means for connection; and a plurality of shaped elongate arms each having a first end, an intermediate point, and a second end, the shaped elongate arms movably attached by hinging means to the straight shaft near the forward end;

the hinging means allowing the shaped elongate arms to fold substantially against the straight shaft in a fully-closed position and allowing the shaped elongate arms to open to a maximum extent of approximately a right angle to the straight shaft;

and wherein:

at least one of the shaped elongate arms further comprises a substantially semi-cylindrical shape between the first end and the intermediate point, the semi-cylindrical shape having an axis, an open side, and a wall, the open side of the semi-cylindrical shape facing the straight shaft when the at least one of the shaped elongate arms is folded against the straight shaft; and wherein:

the semi-cylindrical shape has a slot cut through the wall of the semi-cylindrical shape near the first end, the slot being aligned parallel to the axis of the semi-cylindrical shape; and wherein:

the hinge means comprises a vane projecting from the straight shaft near a midpoint of the straight shaft that fits slidably through the slot in the wall of the semi-cylindrical shape; and a latch projecting from the straight shaft near the forward end of the straight shaft that contacts the vane and prevents the semi-cylindrical shape from sliding off the vane;

and wherein:

the at least one of the shaped elongate arms further comprises a flared portion between the intermediate point and the second end, the flared portion having a concave side with a conical space defined about an axis, the concave side of the flared portion facing the rearward end of the straight shaft;

the axis of the conical space, the axis of the semi-cylindrical shape, and the centerline of the straight shaft lying in a first plane; and the angle formed by the axis of said conical space and the axis of the semi-cylindrical shape being between approximately one hundred degrees and approximately one hundred eighty degrees.

13. The apparatus of claim 12, in which:

said plurality of shaped elongate arms is two, and the two shaped elongate arms are on opposite sides of said straight shaft, the axes of the semi-cylindrical shapes of the two shaped elongate arms lying in the first plane with the centerline of the straight shaft.

14. The apparatus of claim 13, in which:

said first means for connection comprises a shaped wire beginning at, and affixed to, said forward end, extending forwardly along said centerline and curving outwardly away from said centerline in a second plane perpendicular to said first plane, curving backwardly toward said rearward end of said straight shaft, and ending at, and affixed to, a side of the straight shaft, and a swivel having one loop that slides on the shaped wire.

15. The apparatus of claim 14, in which:

the weight and buoyancy of the apparatus is controlled by either:
a) the straight hollow shaft being hollow and watertight;
b) a weight being applied on a side of said front end opposite to said shaped wire; or
c) the straight shaft being hollow and watertight and a weight being applied on the side of said front end opposite to said shaped wire.

* * * * *